United States Patent Office 3,830,765
Patented Aug. 20, 1974

3,830,765
POLYSTYRENE COLOURING GRANULES
Kazmer Fejer, Zell am Ziller, Austria, assignors to Messrs. Color Service GmbH, Hainstadt am Main, West Germany
No Drawing. Filed Feb. 15, 1973, Ser. No. 332,878
Claims priority, application Germany May 17, 1972, P 22 23 969.6
Int. Cl. C08f 45/04, 45/14
U.S. Cl. 260—27 R     3 Claims

ABSTRACT OF THE DISCLOSURE

Granules for colouring polystyrene mouldings comprise dyestuff or pigment, polystyrene, and enough of a compatible high molecular weight substance to lower the melting point of the granules to 130° to 200° C.

---

Colouring of plastics can be carried out by incorporating a colour powder or a pigment in granule form into the material. However, the use of granules is preferred because they can be handled more easily and more cleanly than a colour powder, which produces dust and severely soils the processing machinery. This explains why, when colouring plastics, the masterbatch process is at the present time used whenever possible; the characteristic of the masterbatch process is that a premix which can be granulated is prepared from the colour pigment and a plastics raw material, optionally with addition of additives suitable for the end-use, and this premix, in granule form, is incorporated into the material to be coloured.

Hitherto, the use of the masterbatch process for colouring polystyrene has encountered difficulties which have appeared insuperable, which is why in this case colouring is in most cases carried out using colour powders and the processing disadvantages associated therewith are tolerated. The difficulties in the use of the masterbatch process with polystyrene arise from the fact that, when using known colouring granules, the dyestuff does not distribute itself uniformly in the polystyrene and streaks occur in the moulding.

The present invention provides colouring granules by means of which polystyrene can be coloured uniformly and free of streaks. The granules of the invention comprises dyestuff (pigment), polystyrene, and a further high molecular weight substance compatible therewith, preferably a plastic or a synthetic resin, in a proportion such as to adjust the melting point of the granules to approximately 130° to 200° C., preferably approximately 160° to 180° C. Since the melting point of polystyrene is about 240° C., the additional high molecular weight substance substantially lowers the melting point of the mixture compared with pure polystyrene. The additional substance does not have to be a single compound and it is possible to mix several high molecular substances satisfying the criteria set out above with the polystyrene. An expert can without difficulty select suitable substances for addition to the polystyrene on the basis of the above-mentioned data. In doing so, he will take into account the melting characteristics of the high molecular substances and if appropriate will ascertain, by a simple experiment, the compatibility with polystyrene of the substances that he is considering. Compatibility exists, if when the colouring granules are used, polystyrene can be coloured in such a way that a uniformly coloured streak-free injection moulding can be manufactured using them.

The colouring granules of the invention can be incorporated into polystyrene in a manner known per se, that is to say, for example, during the plasticisation of the polystyrene.

The weight ratio, in the colouring granules, of the polystyrene to the other high molecular weight substance can lie between 30:70 and 50:50. In individual cases, the ratio depends on the processing conditions anticipated for the coloured material. The materials used in making the granules of the invention can be mixed together in a kneader. Following thorough mixing, the mixture is then granulated in a manner known per se.

As an example a high molecular weight substance, suitable for use in the invention, a hydrogenated colphonyl-glyycerine ester or a ketone resin, for example based on cyclohexanone, may be mentioned. These substances fulfil the conditions of the invention.

Suitable pigments for use in the invention include cadmium sulphide, cadmium selenide, and their mixtures with each other (including the mixture with added zinc sulphide known as "cadmium red"), iron oxides, chromic oxides, ultramarines, phthalocyanines, and azo- and diazo-dyestuffs.

The colouring granules of the invention may be incorporated in any known sort of translucent and transparent, as well as impact-resistant, polyystyrene.

The following example illustrates the invention.

EXAMPLE 30 parts by weight of impact-resistant polystyrene (natural colour) are mixed with 70 parts by weight of a hydrogenated colophenyl-glyycerine ester sold under the trademark Hercules Stablyeite Ester 10, in a kneader at about 280° C. During the mixing process, 20 parts by weight of cadmium red are added. The mixing process is continued until the dyestuff has become uniformly distributed in the mixture. After cooling, the mixture is comminuted to granules in a hammer mill.

I claim:
1. Colouring granules comprising a dyestuff or pigment, polystyrene and a hydrogenated colophony-glycerine ester, in a proportion such that the melting point of the granules is from approx. 130° to 200° C., the weight ratio of polystyrene to said hydrogenated colophony-glycerine ester being from 30:70 to 50:50.
2. Granules according to claim 1 in which the proportion of the hydrogenated colophony-glycerine ester is such that the granules melt at 160° to 180° C.
3. The process of mixing the colouring granules according to claim 1 with a bulk polystyrene having a melting region considerably higher than the melting point of the colouring granules.

References Cited

UNITED STATES PATENTS

| | | | |
|---|---|---|---|
| 3,536,658 | 10/1970 | Wich | 260—41 R |
| 3,586,247 | 6/1971 | Perrins | 106—308 M |

FOREIGN PATENTS

| | | | |
|---|---|---|---|
| 978,242 | 12/1964 | Great Britain | 106—308 M |

MORRIS LIEBMAN, Primary Examiner

J. H. DERRINGTON, Assistant Examiner

U.S. Cl. X.R.

106—308 M; 260—42.56